US012444438B2

(12) United States Patent
Hu et al.

(10) Patent No.: US 12,444,438 B2
(45) Date of Patent: Oct. 14, 2025

(54) MAGNETIC HEAD AIR BEARING DESIGN WITH ISLAND BLOCKER FOR SMEAR MITIGATION

(71) Applicant: Western Digital Technologies, Inc., San Jose, CA (US)

(72) Inventors: Yong Hu, San Ramon, CA (US); Taichi Nakamura, Sagamihara (JP); Biao Sun, Fremont, CA (US); Xiaojuan Ran, Shenzhen (CN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/581,359

(22) Filed: Feb. 19, 2024

(65) Prior Publication Data
US 2025/0259650 A1   Aug. 14, 2025

(30) Foreign Application Priority Data
Feb. 8, 2024   (CN) .......................... 202410178991.6

(51) Int. Cl.
*G11B 5/60* (2006.01)
*G11B 33/14* (2006.01)
*G11B 5/00* (2006.01)

(52) U.S. Cl.
CPC ........ *G11B 5/6082* (2013.01); *G11B 33/1446* (2013.01); *G11B 2005/0021* (2013.01); *G11B 2209/02* (2013.01)

(58) Field of Classification Search
None
See application file for complete search history.

(56) References Cited

U.S. PATENT DOCUMENTS

| 5,831,792 | A  | * | 11/1998 | Ananth | G11B 5/40 |
| 5,940,249 | A  | * | 8/1999 | Hendriks | G11B 5/58 |
| 6,498,701 | B1 | * | 12/2002 | Berg | G11B 5/6005 |
| 6,594,113 | B2 |   | 7/2003 | Rao et al. | |
| 6,920,015 | B2 |   | 7/2005 | Mundt et al. | |

(Continued)

OTHER PUBLICATIONS

Qilong Cheng et al., "Experimental study of smear formation and removal in heat-assisted magnetic recording," Tribology International 165 (2022) 107258 (https://doi.org/10.1016/j.triboint.2021.107258).

(Continued)

*Primary Examiner* — William J Klimowicz

(57) ABSTRACT

A slider for a data storage device may include a trailing pad comprising a recording head, an outer surface, and an inner surface, wherein the outer surface is at the media-adjacent level and the inner surface is at the first recessed level. The slider may further include particle-blocking structure comprising a hole in the inner surface of the trailing pad, wherein a bottom surface of the hole is at the second recessed level, and an island blocker situated within the hole, wherein a media-facing surface of the island blocker is at the media-adjacent level, wherein the recording head is situated between the island blocker and a trailing edge of the slider. Also disclosed are data storage devices comprising sliders having particle-blocking structures comprising a hole and an island blocker. Also disclosed are methods of manufacturing sliders having particle-blocking structures comprising a hole and an island blocker.

20 Claims, 11 Drawing Sheets

(56) References Cited

U.S. PATENT DOCUMENTS

| | | | |
|---|---|---|---|
| 7,193,805 B1 * | 3/2007 | Haddock | G11B 5/6005 29/603.03 |
| 7,760,468 B2 | 7/2010 | Cha et al. | |
| 7,936,538 B1 | 5/2011 | Zhang et al. | |
| 8,477,458 B2 | 7/2013 | Lee et al. | |
| 8,649,126 B2 * | 2/2014 | Bolasna | G11B 5/6005 360/236.5 |
| 8,681,455 B2 | 3/2014 | Reddy et al. | |
| 8,810,968 B2 | 8/2014 | Rajasekharan et al. | |
| 9,001,468 B2 | 4/2015 | Krolnik, II et al. | |
| 9,190,090 B1 | 11/2015 | Zhang et al. | |
| 9,230,587 B1 * | 1/2016 | Hu | G11B 5/6082 |
| 9,431,035 B2 | 8/2016 | Jones et al. | |
| 9,691,422 B1 * | 6/2017 | Hu | G11B 5/6005 |
| 9,761,260 B1 | 9/2017 | Ferrero et al. | |
| 10,037,774 B1 | 7/2018 | Ferrero et al. | |
| 10,058,890 B1 | 8/2018 | Buettner et al. | |
| 10,249,334 B1 * | 4/2019 | Hu | G11B 5/6082 |
| 10,629,236 B1 | 4/2020 | Liu et al. | |
| 10,679,656 B1 | 6/2020 | Lu et al. | |
| 10,737,291 B2 | 8/2020 | Buettner et al. | |
| 10,796,721 B1 | 10/2020 | Rakshit et al. | |
| 10,984,828 B1 * | 4/2021 | Huang | G11B 5/4826 |
| 11,232,812 B1 | 1/2022 | Zheng et al. | |
| 11,355,143 B2 | 6/2022 | Lu et al. | |
| 11,587,583 B1 * | 2/2023 | Hu | G11B 5/4826 |
| 11,587,584 B1 * | 2/2023 | Hu | G11B 5/60 |
| 11,942,124 B1 * | 3/2024 | Hu | G11B 5/6082 |
| 2003/0058578 A1 | 3/2003 | Boutaghou et al. | |
| 2003/0184915 A1 * | 10/2003 | Kameyama | G11B 5/6005 360/235.8 |
| 2009/0231759 A1 * | 9/2009 | Kameyama | G11B 5/4826 360/234.3 |
| 2011/0058275 A1 * | 3/2011 | Kohira | G11B 5/6082 360/75 |
| 2011/0195275 A1 | 8/2011 | Huha et al. | |
| 2012/0134055 A1 * | 5/2012 | Tsuda | G11B 5/6082 360/235.5 |

OTHER PUBLICATIONS

Shuyu Zhang et al., "Slider Designs For Controlling Contamination," Journal of Tribology Jul. 1997, vol. 119, pp. 537-540.

Xinjiang Shen et al., "Particle Flow and Contamination in Slider Air Bearings for Hard Disk Drives," Transactions of the ASME, vol. 125, Apr. 2003, pp. 358-363.

\* cited by examiner

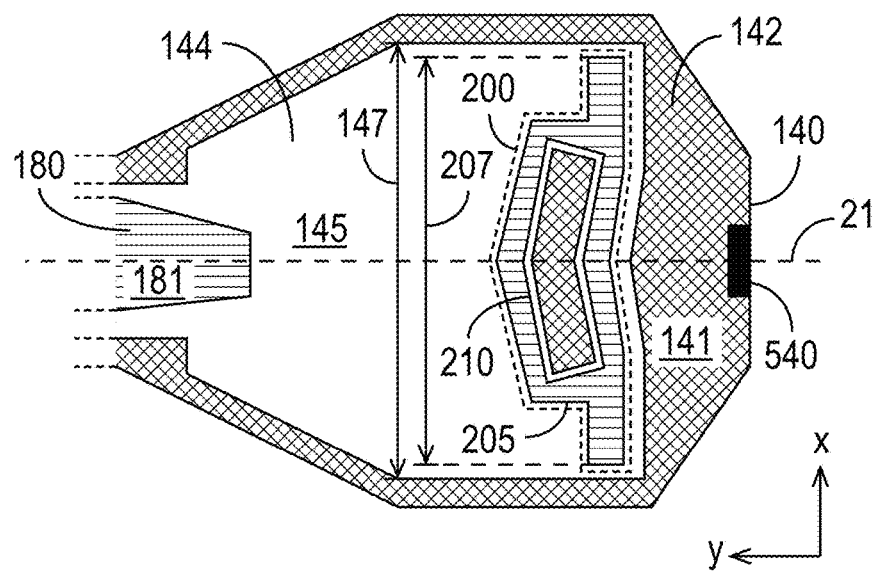
FIG. 2C
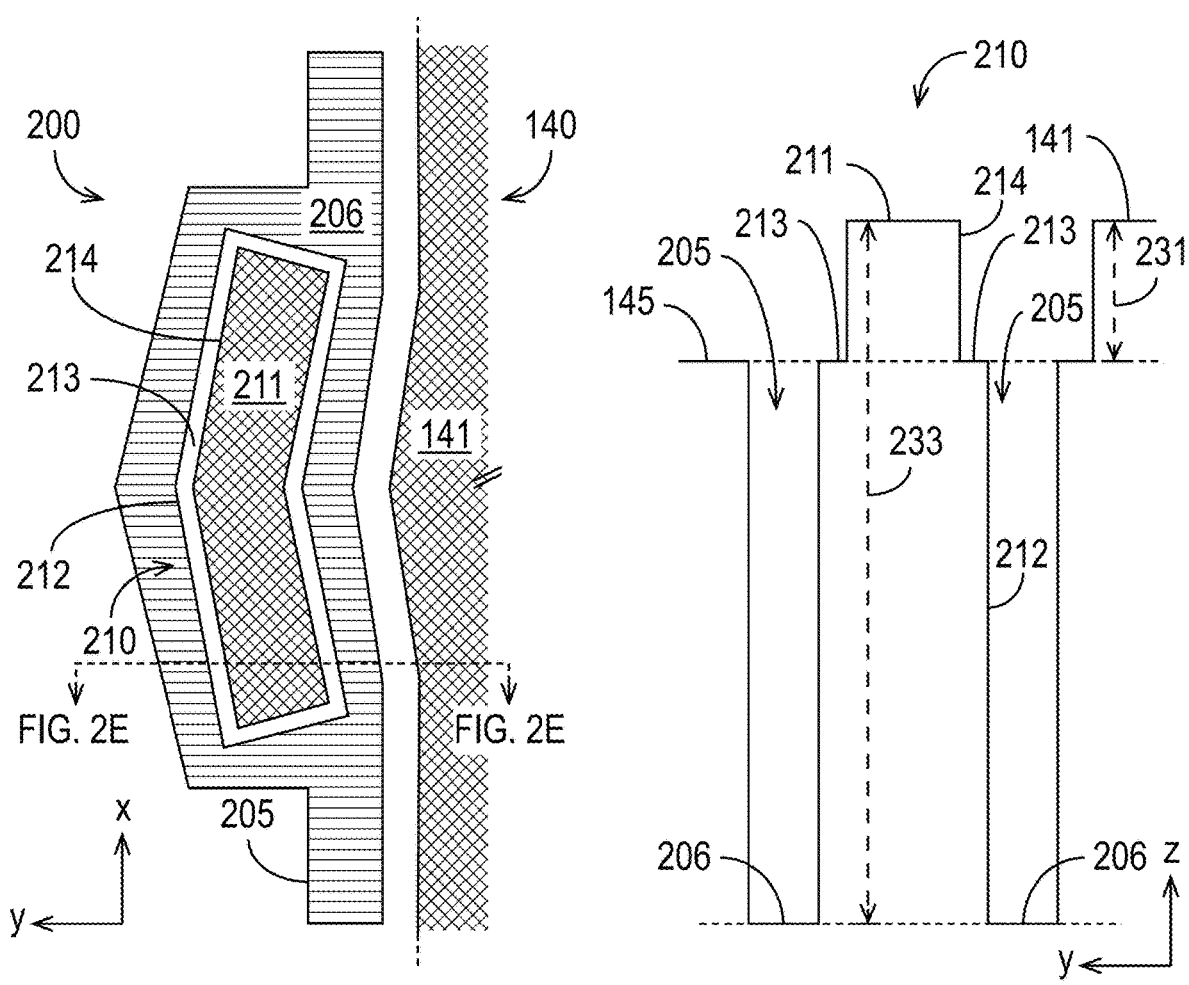
FIG. 2D
FIG. 2E

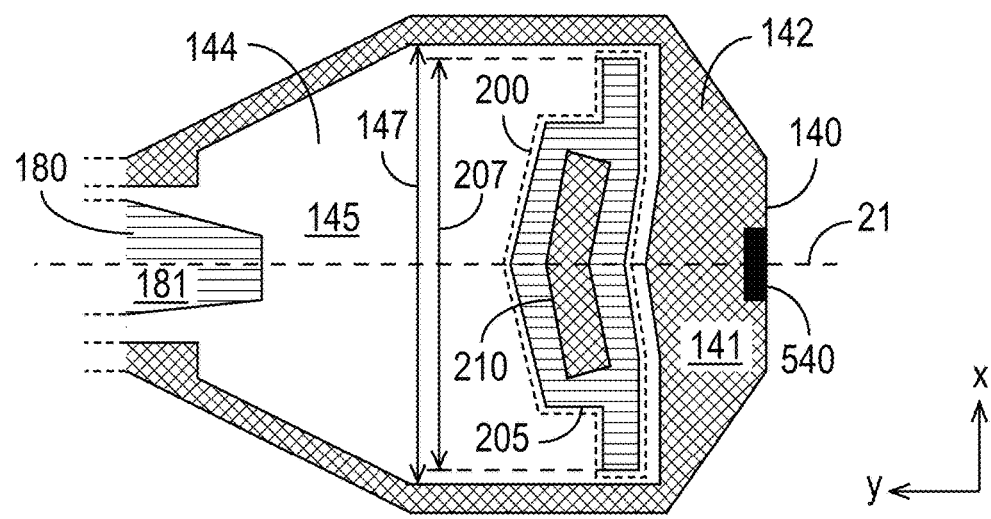
FIG. 3A
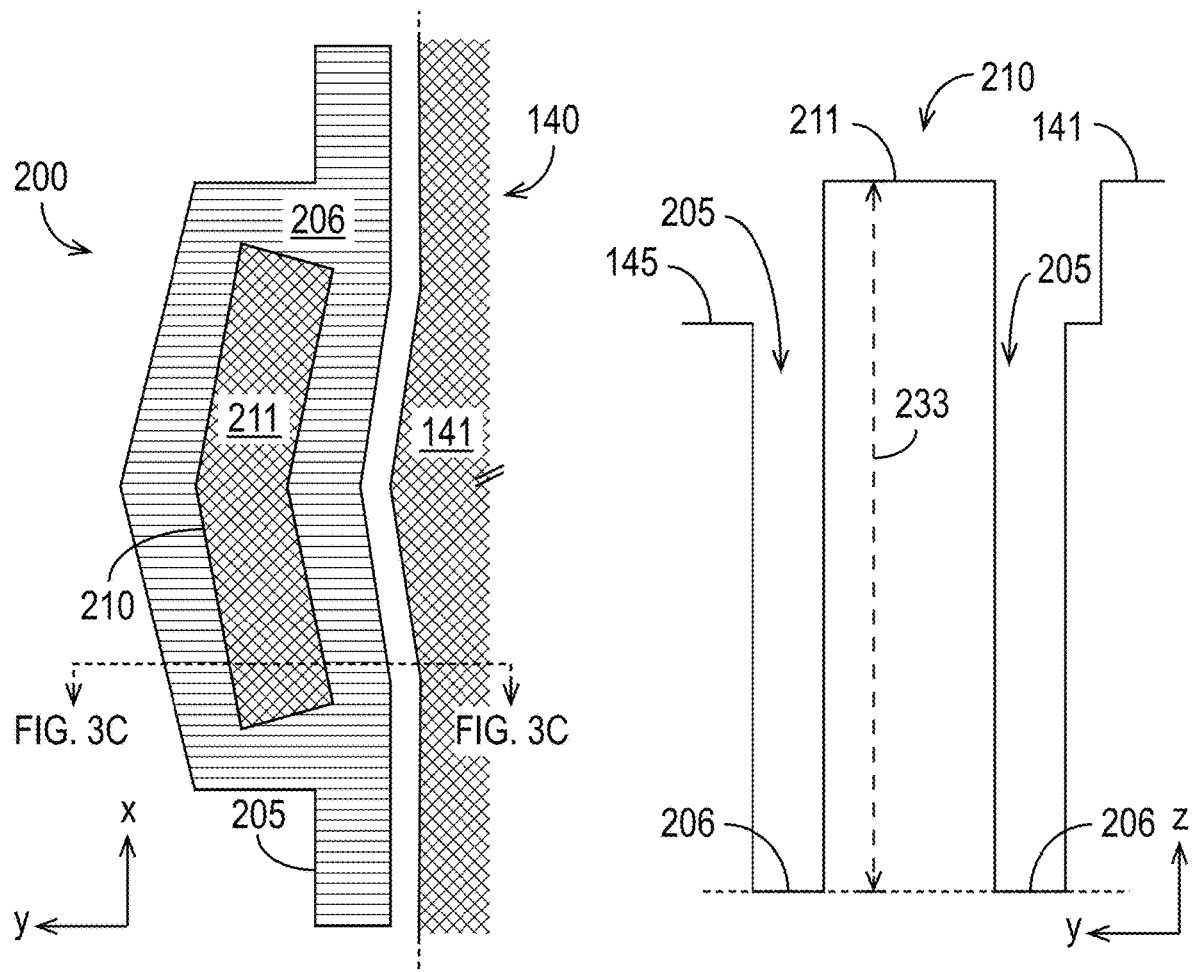
FIG. 3B
FIG. 3C

MAGNETIC HEAD AIR BEARING DESIGN WITH ISLAND BLOCKER FOR SMEAR MITIGATION

CROSS-REFERENCE TO RELATED APPLICATIONS

This application claims priority to, and hereby incorporates by reference in its entirety for all purposes, China patent application No. 202410178991.6, which is entitled "MAGNETIC HEAD AIR BEARING DESIGN WITH ISLAND BLOCKER FOR SMEAR MITIGATION" and was filed on Feb. 8, 2024.

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Many older data storage devices operate in a standard air (e.g., nitrogen, oxygen, and water vapor mixture) atmosphere. Spinning recording media in hard disk drives at high revolutions per minute against the friction of an air atmosphere is largely inefficient and requires a certain amount of power. To address this inefficiency, a data storage device can be filled at least partially with a lower-density gas, such as helium or hydrogen, and sealed to control and maintain the internal environment of the data storage device. Sealing mitigates or prevents leakage of internal gases from within the data storage device. The use of helium, which has a density that is approximately one-seventh that of air, reduces friction and vibration in the data storage device, thereby creating less drag and turbulence. Consequently, by running the data storage device in a less-dense atmosphere, such as an atmosphere of helium or a mixture of helium and oxygen, friction on the recording media is reduced, thereby causing the recording media to require less power in order to spin at a similar rate as the recording media in data storage devices that operate in standard air conditions. The use of helium generally also reduces the operating temperature of the data storage device, as well as the amount of noise it generates.

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a need for write heads that incorporate higher magnetic moment materials, or techniques such as perpendicular recording (or both).

Another solution uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy (Ku) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR data storage device uses a laser source and an optical waveguide coupled to an optical near-field transducer (NFT) for heating the recording material on the media. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the media surface. An NFT may have a generally triangular output end, such that an evanescent wave generated at a surface of the waveguide couples to surface plasmons excited on the surface of the NFT, and a strong optical near-field is generated at the apex of the triangular output end.

One potential issue with HAMR devices is that excessive heating of the NFT can cause performance degradation and eventually failure of the data storage device. One possible cause of failure due to excessive heating may be due to adsorption of carbonaceous material on the slider overcoat near the NFT tip. Relative to data storage devices that use older recording technologies such as perpendicular magnetic recording, HAMR devices tend to have a thicker carbon overcoat on the media. Hydrocarbon molecules from the recording media overcoat and lubricant can become mobile at elevated temperatures and adsorb on the ABS of the slider. Over time, these molecules can form a "smear" on the ABS that absorbs power from the laser source and causes the NFT, which normally operates at very high temperatures, to become even hotter than usual. The heat transfer can result in diffusion of the NFT metal until the NFT tip rounds and recording degrades, eventually possibly leading to failure of the data storage device.

In addition to potentially affecting the NFT, smear can affect the fly height of the slider in a manner that is not consistent over time. The carbonaceous material can build up as the data storage device operates, and then become detached (e.g., when thick enough that it touches the media and drops off). Accordingly, the changing characteristics of smear (e.g., its presence, thickness, etc.) can cause variations in the slider fly height. These variations can adversely affect the performance of the data storage device, such as its writing performance.

Smear is common in data storage devices that use HAMR. It is also common in sealed data storage devices that have fewer oxygen molecules.

Therefore, there is a need for improvements to mitigate the effects of smear in these and other types of data storage devices.

SUMMARY

This summary represents non-limiting embodiments of the disclosure.

Disclosed herein are sliders that include particle-blocking structures, methods of manufacturing such sliders, and data storage devices including such sliders. The particle-blocking structures include a hole in a trailing pad of the slider, and an island blocker situated within the hole. In some embodiments, the island blocker includes a lower portion and an upper portion, with a ledge between the lower and upper portions. In some embodiments, a media-facing surface of the island blocker is at the level of the ABS that is closest to the media when the slider is installed in a data storage device. In some embodiments, the hole has a large depth (e.g., between about 800 nm and about 5000 nm relative to the media-facing surface of the NFT) to facilitate the capture of particles. In some embodiments, the island blocker has a form factor (e.g., size and/or shape) such that, regardless of the slider skew angle, the island blocker is situated to block and/or redirect particles heading toward the recording head.

In some aspects, the techniques described herein relate to a slider for a data storage device, the slider having an ABS that includes at least three levels, the at least three levels including a media-adjacent level, a first recessed level, and a second recessed level, wherein, in an orientation in which the ABS is oriented upward, the media-adjacent level is above the first recessed level, and the first recessed level is above the second recessed level. In some embodiments, the slider includes a trailing pad including a recording head, an outer surface, and an inner surface, wherein the outer surface is at the media-adjacent level and the inner surface is at the first recessed level. In some embodiments, the slider further includes a hole in the inner surface of the trailing pad, wherein a bottom surface of the hole is at the second recessed level, and an island blocker situated within the hole, wherein a media-facing surface of the island blocker is at the media-adjacent level. In some embodiments, the recording head is situated between the island blocker and a trailing edge of the slider.

In some aspects, the techniques described herein relate to a slider, a maximum width of the hole in a cross-track direction is at least 75 percent of a maximum width of the inner surface of the trailing pad in the cross-track direction.

In some aspects, at least one of a size or a shape of the island blocker is configured to block and/or redirect particles moving in an airflow direction toward the recording head at all slider skew angles between a maximum inner-diameter skew angle and a maximum outer-diameter skew angle.

In some aspects, the first recessed level is recessed from the media-adjacent level by between about 50 nm and about 300 nm. In some aspects, the second recessed level is recessed from the media-adjacent level by between about 500 nm and about 2500 nm.

In some aspects, the recording head includes a HAMR writer.

In some aspects, the techniques described herein relate to a method of manufacturing a slider that has a particle-blocking structure, the method including: in a first manufacturing step in which at least one other surface at the second recessed level is created, creating the hole; and in a second manufacturing step in which at least one other surface at the media-adjacent level is created, creating the island blocker.

In some aspects, the island blocker includes a lower portion and an upper portion.

In some aspects, the island blocker includes a ledge at the first recessed level.

In some aspects, the techniques described herein relate to a method of manufacturing a slider that has a particle-blocking structure including a ledge at the first recessed level, the method including: in a first manufacturing step in which at least one other surface at the second recessed level is created, creating the hole; in a second manufacturing step in which at least one other surface at the first recessed level is created, creating the ledge; and in a third manufacturing step in which at least one other surface at the media-adjacent level is created, creating the media-facing surface of the island blocker.

In some aspects, the techniques described herein relate to a slider for a HAMR data storage device, the slider including a HAMR head including an NFT and a particle-blocking structure configured to mitigate a formation of smear on a media-facing surface of the NFT. In some embodiments, the particle-blocking structure includes an island blocker within a hole in a trailing pad of the slider, the hole extending perpendicular to an ABS of the slider. In some embodiments, the island blocker has a form factor such that the island blocker blocks oncoming particles with angles of arrival within a specified range of a centerline of the slider.

In some aspects, the specified range includes a first angular range on a first side of the centerline and a second angular range on a second side of the centerline.

In some aspects, a depth of the hole is between about 800 nm and about 5000 nm relative to the media-facing surface of the NFT.

In some aspects, the techniques described herein relate to a method of manufacturing a slider that has a particle-blocking structure, the method including: in a first manufacturing step, creating the hole; and in a second manufacturing step performed after the first manufacturing step, creating the island blocker.

In some aspects, the island blocker includes a lower portion and an upper portion.

In some aspects, the island blocker includes a ledge, wherein the ledge is recessed from a media-facing surface of the island blocker.

In some aspects, a recess distance between the media-facing surface of the island blocker and the ledge is between about 50 nm and about 300 nm.

In some aspects, the techniques described herein relate to a method of manufacturing a slider that has a particle-blocking structure that includes a ledge, the method including: in a first manufacturing step, creating the hole; in a second manufacturing step performed after the first manufacturing step, creating the ledge; and in a third manufacturing step performed after the second manufacturing step, creating the media-facing surface of the island blocker.

In some aspects, the techniques described herein relate to a data storage device that includes a recording media and a slider that includes a particle-blocking structure.

BRIEF DESCRIPTION OF THE DRAWINGS

Objects, features, and advantages of the disclosure will be readily apparent from the following description of certain embodiments taken in conjunction with the accompanying drawings in which:

FIGS. 2A, 2B, 2C, 2D, and 2E illustrate an example of the particle-blocking structure in accordance with some embodiments.

FIGS. 3A, 3B, and 3C illustrate an example of an island blocker in accordance with some embodiments.

Figure 1A:
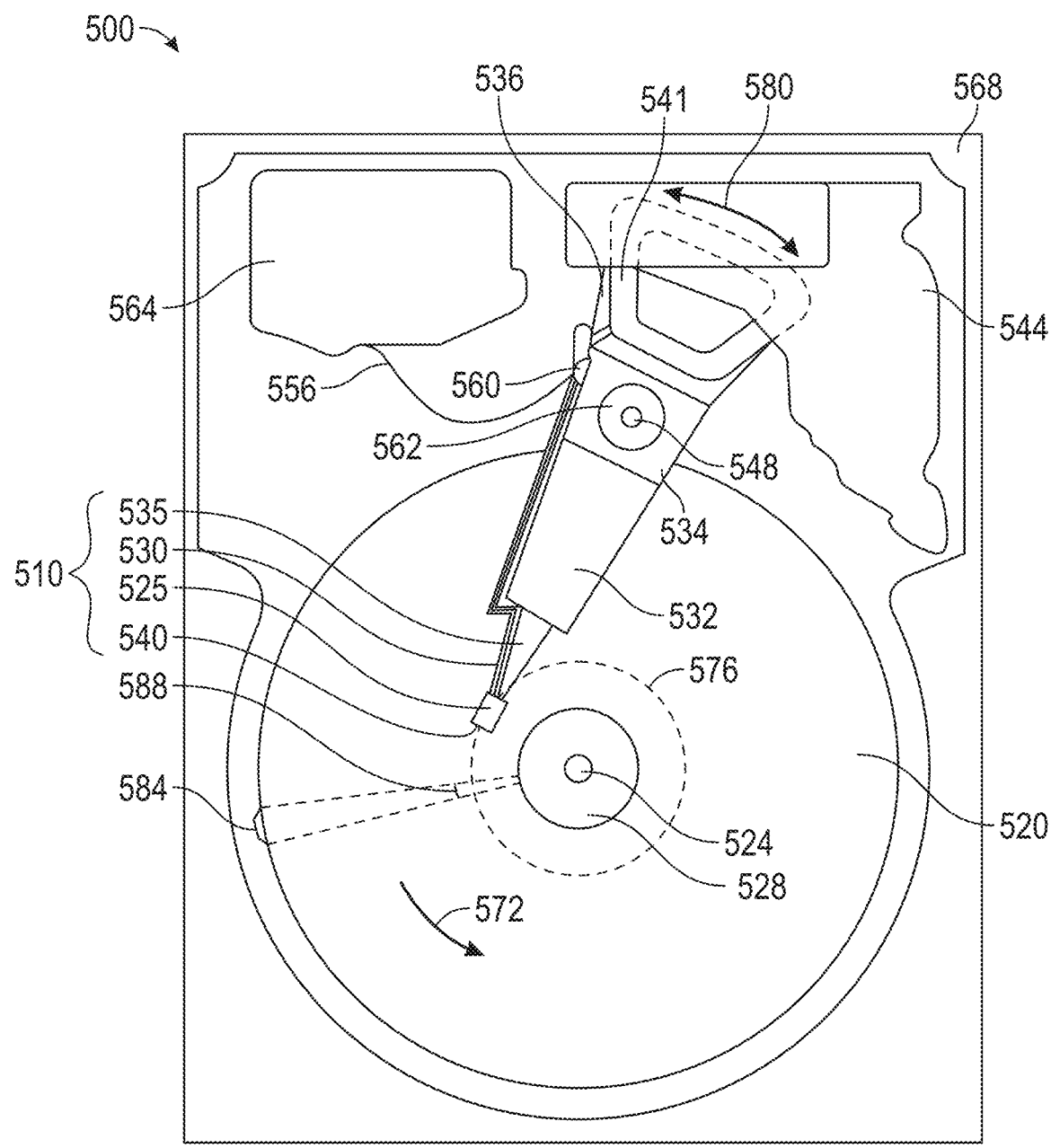
FIG. 1A is a plan view illustrating an example of a data storage device that may include one or more of the embodiments disclosed herein.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are slider ABS designs to improve performance in the presence of smear. The disclosed designs promote blocking and/or trapping of particles (e.g., carbonaceous material) that might otherwise cause smear. By blocking and/or trapping these particles, the new ABS designs reduce variations in slider fly height due to smear build-up and drop-off, thereby promoting a more consistent slider fly height. In addition, the new designs provide higher damping of transient disturbances (e.g., to the slider fly height due to smear drop-off).

FIG. 1A is a plan view illustrating an example of a data storage device 500, illustrated as a hard disk drive, that may include one or more of the embodiments disclosed herein. The data storage device 500 may operate under standard air conditions, or it may be a sealed device (e.g., filled with helium, a helium mixture, or another gas or mixture of gases). FIG. 1A illustrates an example of the functional arrangement of components of the data storage device 500, including a slider 525 that includes a recording head 540. The recording head 540 (which may also be referred to as a transducer or a read/write transducer) includes a write element and a read element for, respectively, writing information to and reading information from a recording medium 520 of the data storage device 500. The recording head 540 may be, for example, a HAMR head, as described further below.

The data storage device 500 includes at least one head gimbal assembly (HGA) 510, which includes the slider 525, a suspension and actuator arm 530 attached to the slider 525, and a load beam 535 attached to the suspension and actuator arm 530. The data storage device 500 also includes at least one recording medium 520, which may be, for example, a magnetic recording medium, rotatably mounted on a spindle 524, and a drive motor (not shown) attached to the spindle 524 for rotating the recording medium 520. The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of an HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, the HSA is the assembly configured to move the slider 525 to enable the recording head 540 to access portions of the recording medium 520 (e.g., magnetic-recording disks) for read and write operations.

In the example data storage device 500 shown in FIG. 1A, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics (AE) module 560, which may have an on-board pre-amplifier for the read signal, as well as other read-channel and write-channel electronic components. The AE module 560 may be attached to the carriage 534 as shown. The flex cable 556 is coupled to an electrical-connector block 564, which provides electrical communication through electrical feed-throughs provided by a data storage device housing 568. The data storage device housing 568, in conjunction with a cover (not shown), provides a protective enclosure for the information storage components of the data storage device 500. The enclosure may be sealed and filled with helium, a helium mixture, or another gas or gas mixture.

Other electronic components, including a disk controller and servo electronics such as a digital-signal processor (DSP), can be included in the data storage device 500 to provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of air (or gas) that acts as an air bearing or gas bearing on which the air-bearing surface (ABS) of the slider 525 rides so that the slider 525 flies above the surface of the recording medium 520 without making contact with a thin magnetic-recording layer of the recording medium 520 in which information is recorded. (It is to be appreciated that the term "air-bearing surface" is used herein regardless of whether the data storage device operates in standard air conditions or other conditions (e.g., in helium or a helium mixture).)

The electrical signal provided to the voice coil 541 of the VCM enables the recording head 540 of the HGA 510 to access a track 576 on which information is recorded. Thus, the armature 536 of the VCM swings through an arc 580, which allows the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data from the track 576 or writes data to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

Figure 1B:
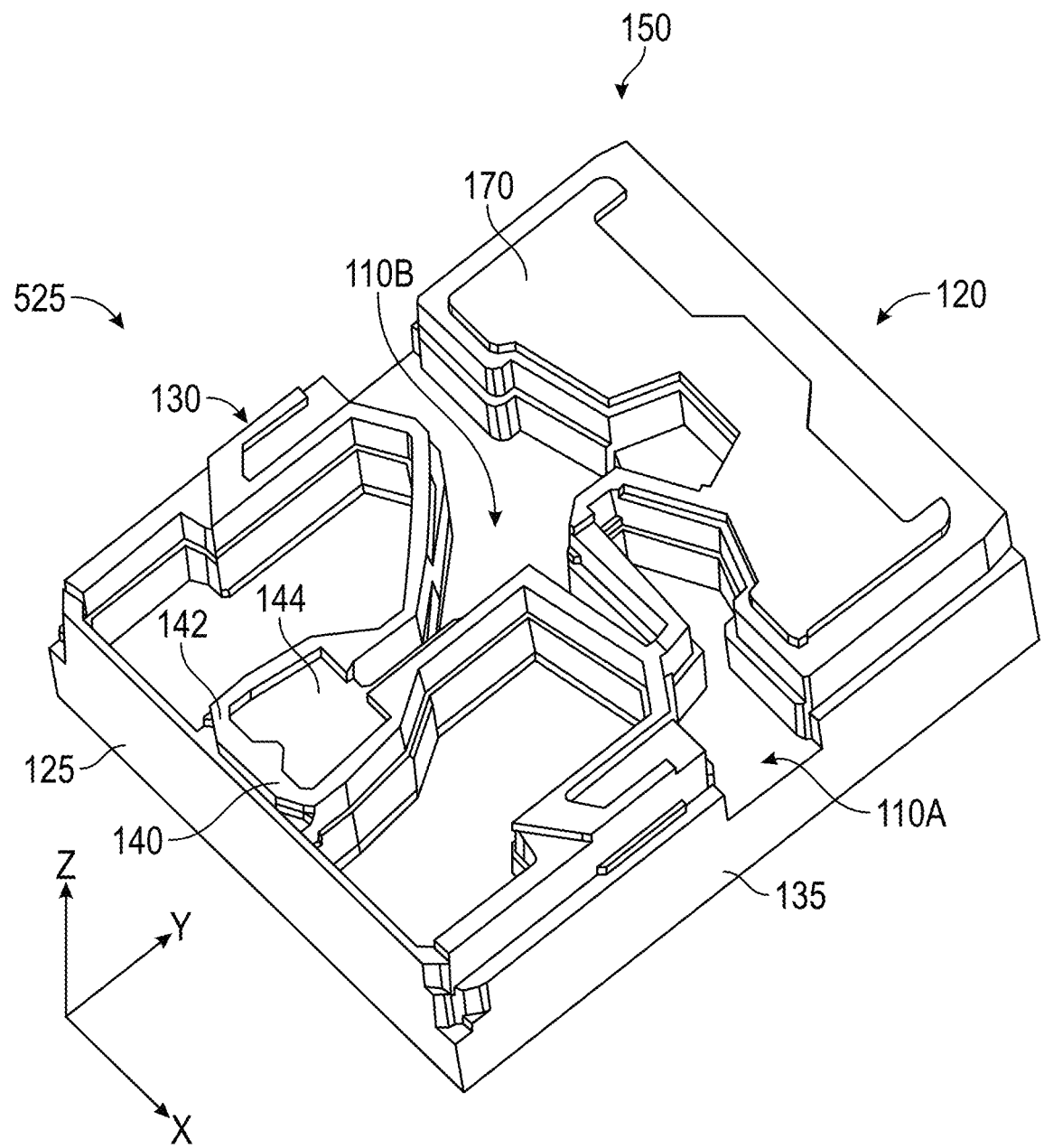
FIG. 1B is a perspective view of a conventional slider.

FIG. 1B is a perspective view of a conventional slider 525. To facilitate the explanations herein, FIG. 1B includes a set of axes for a rectangular coordinate system. The x direction denotes a cross-track direction, and the y direction denotes an along-the-track or down-track direction. The z direction is perpendicular to both the x and y directions. Using the illustrated axes, the slider 525 has a leading-edge surface 120 in an x-z plane, a trailing-edge surface 125 in another x-z plane, an outer-diameter edge 135 in a y-z plane extending between the leading-edge surface 120 and the trailing-edge surface 125, and an inner-diameter edge 130 extending in another y-z plane that also extends between the leading-edge surface 120 and the trailing-edge surface 125.

The slider 525 also has an ABS 150, which includes, among other things, two mid-slider cavities, namely, an outer-diameter side cavity 110A and an inner-diameter side cavity 110B. The outer-diameter side cavity 110A and inner-diameter side cavity 110B increase the stability of the slider 525 by encouraging air (or gas) flow in to the outer-diameter side cavity 110A and inner-diameter side cavity 110B, particularly at large skew angles, discussed further below. The outer-diameter side cavity 110A and inner-diameter side cavity 110B can have mouths (openings) at the outer-diameter edge 135 and the inner-diameter edge 130 of, for example, around 3 microns.

The slider 525 also has a leading edge pad 170 and a trailing edge pad 140. The trailing edge pad 140 has an outer region 142 and an inner region 144. As described further below, the recording head 540 resides on/in the outer region 142 of the trailing edge pad 140, near the trailing-edge surface 125.

Figure 1C:
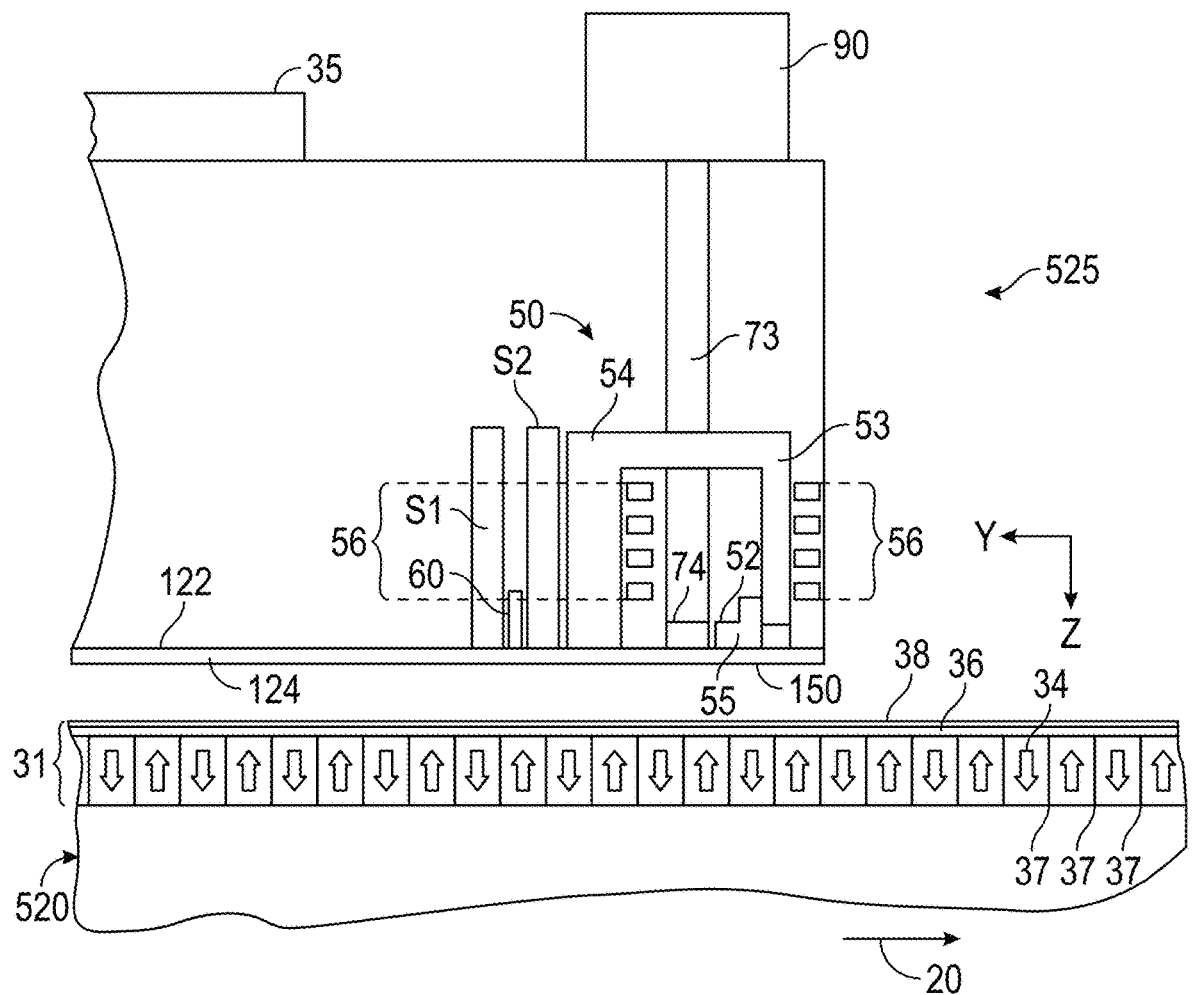
FIG. 1C is a schematic cross-sectional view illustrating an example of a HAMR head according to the prior art.

FIG. 1C is a schematic cross-sectional view illustrating an example of a HAMR head according to the prior art. The HAMR head shown in FIG. 1C is capable of functioning as the recording head 540 in some embodiments. In FIG. 1C, the recording medium 520, which moves in the direction 20, is depicted as a conventional magnetic disk with the recording layer 31 being a continuous non-patterned magnetic recording layer of magnetizable material with magnetized regions, referred to herein as bits 34. The bits 34 are physically adjacent to one another, and the boundaries between adjacent bits are referred to as magnetic transitions 37. The bits 34 are recorded in individual data sectors. The recording layer 31 is typically formed of a high-anisotropy ($K_u$) substantially chemically-ordered FePt alloy (or CoPt alloy) with perpendicular magnetic anisotropy. The recording medium 520 includes an overcoat 36, typically formed of amorphous diamond-like carbon (DLC), and a liquid lubricant layer 38, typically a bonded perfluropolyether (PFPE).

The slider 525 is supported by a suspension 35. The slider 525 has a surface 122 that faces the recording medium 520. An overcoat 124 is deposited onto the surface 122. The overcoat 124 is typically a DLC overcoat with a thickness in the range of about 10 to 30 Å. An optional adhesion film or undercoat (not shown), such as a 1 to 5 Å silicon nitride ($SiN_x$) film, may be deposited on the surface 122 before deposition of the overcoat 124.

In the illustrated example, the slider 525 supports a write head 50, a magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with a write pole end 52, and a return pole 54. A magnetic field generated by the coil 56 is transmitted through the main magnetic pole 53 to the write pole end 52 located near an NFT 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the ABS 150 when light from the optical waveguide 73 is incident. Oscillating tip charge creates an intense near-field pattern, heating the recording layer 31. The metal structure of the NFT 74 can create resonant charge motion (surface plasmons) to further increase intensity and heating of the recording layer 31. To record to the recording medium 520, the recording layer 31 of recording medium 520 is heated by the optical near-field generated by the NFT 74 and, at the same time, a region or bit 34 is magnetized and thus written onto the recording layer 31 by applying a recording magnetic field generated by the write pole end 52.

A semiconductor laser 90 is mounted to the top surface of slider 525. An optical waveguide 73 for guiding light from the semiconductor laser 90 to the NFT 74 is formed inside the slider 525. The semiconductor laser 90 is typically capable of operating at different power levels. Materials that ensure a refractive index of the optical waveguide 73 core material to be greater than a refractive index of the cladding material may be used for the optical waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The optical waveguide 73 that delivers light to NFT 74 is preferably a single-mode waveguide.

Figure 1D:
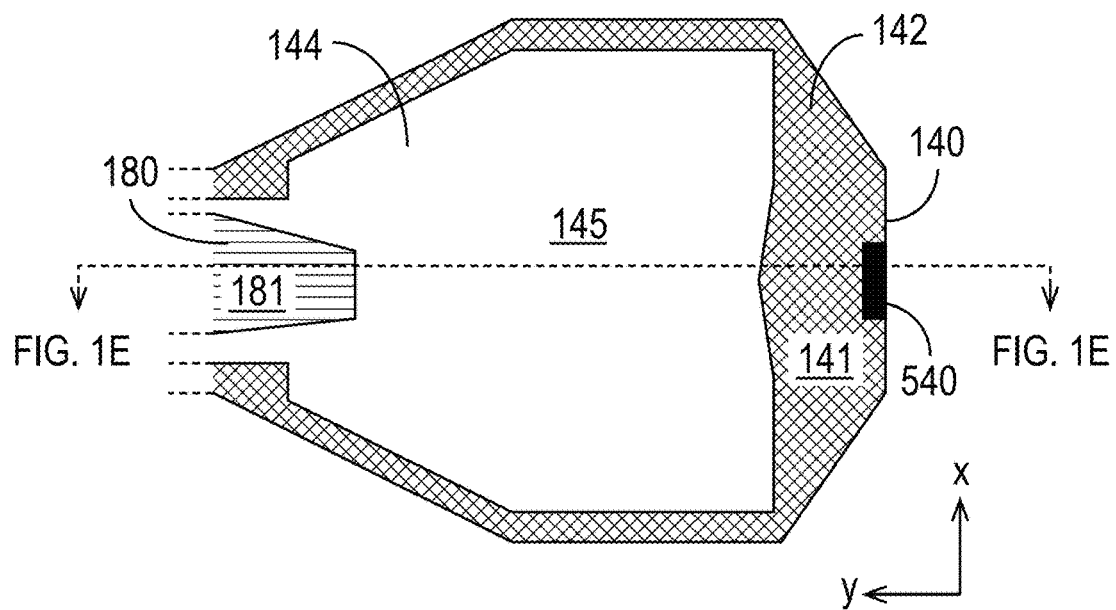
FIG. 1D is an ABS view of a trailing edge pad.

FIG. 1D is an ABS view of a trailing edge pad 140. The trailing edge pad 140 has an outer region 142 and an inner region 144. A location of a recording head 540 is also depicted in FIG. 1D, but it is to be appreciated that the rectangle representing the recording head 540 in the drawing is not to scale. In the illustrated example in FIG. 1D, the outer region 142 of the trailing edge pad 140 has a surface 141 that is part of the media-adjacent surface of the ABS 150, and the inner region 144 of the trailing edge pad 140 has a surface 145 that is recessed from the surface 141. The media-adjacent surface of the ABS 150 is the surface, or plurality of surfaces, of the ABS 150 that are closest to the recording medium 520 when the slider 525 is installed in a data storage device 500, ignoring that the slider 525 may fly at a pitch angle relative to horizontal. FIG. 1D also shows a cavity 180, which has a surface 181. In the z direction, the surface 181 is recessed from the surface 145. Thus, with the trailing edge pad 140 as shown in FIG. 1D, the slider 525 has at least three surfaces at at least three levels. As explained above, the surface 141 is part of the media-adjacent surface of the ABS 150. The media-adjacent surface of the ABS 150 can be said to be at a media-adjacent level of the ABS 150. The surface 145 is part of a first recessed surface of the ABS 150, which can be said to be at a first recessed level, where the recess is in the z direction from the media-adjacent surface. The surface 181 is part of a second recessed surface of the ABS 150, which can be said to be a second recessed level, where the recess is in the z direction from both the media-adjacent surface and the first recessed surface. It is to be appreciated that the ABS 150 can have more than two recessed levels.

Figure 1E:
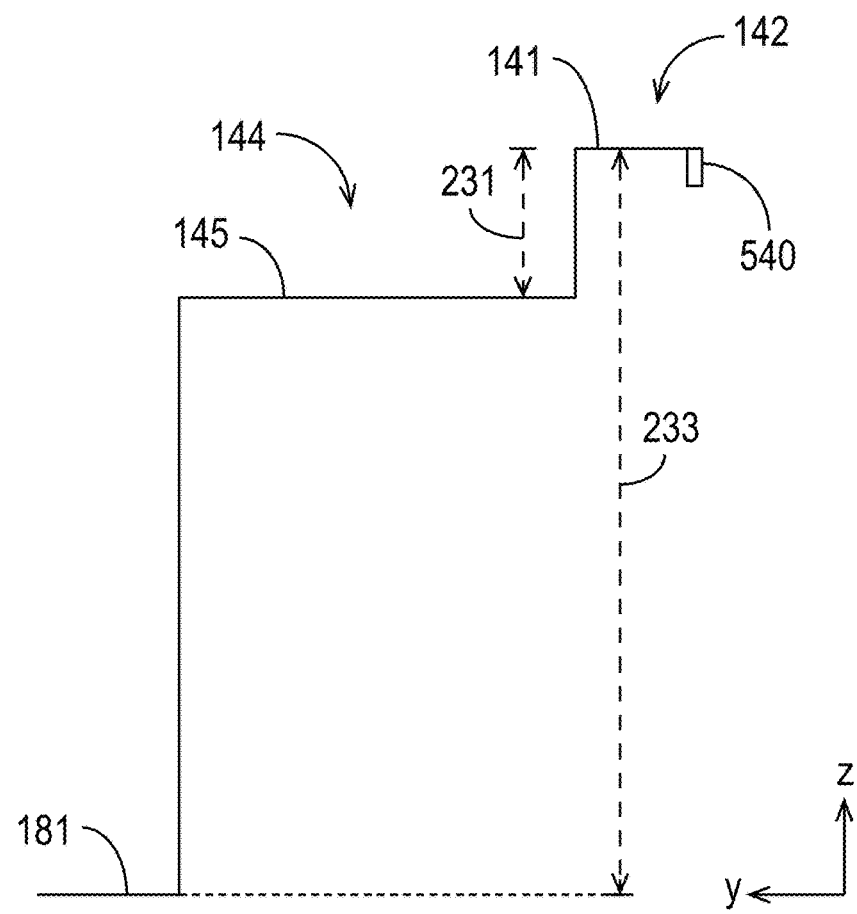
FIG. 1E is a cross-section view of the trailing edge pad of FIG. 1D at the location indicated in FIG. 1D.

FIG. 1E is a cross-section view of the trailing edge pad 140 at the location indicated in FIG. 1D. The surface 181 is at the lowest level of the ABS 150 in the illustrated example. In the z direction, the surface 181 is recessed from the surface 141 of the trailing edge pad 140 by a distance 233. The surface 145 of the trailing edge pad 140 is recessed from the surface 141 by a distance 231 in the z direction. The distance 233 may be significantly larger than the distance 231. For example, the distance 233 may be on the order of a micron or more (e.g., 500 nm to 2500 nm), whereas the distance 231 may be much smaller (e.g., 50-300 nm).

Figure 1F:
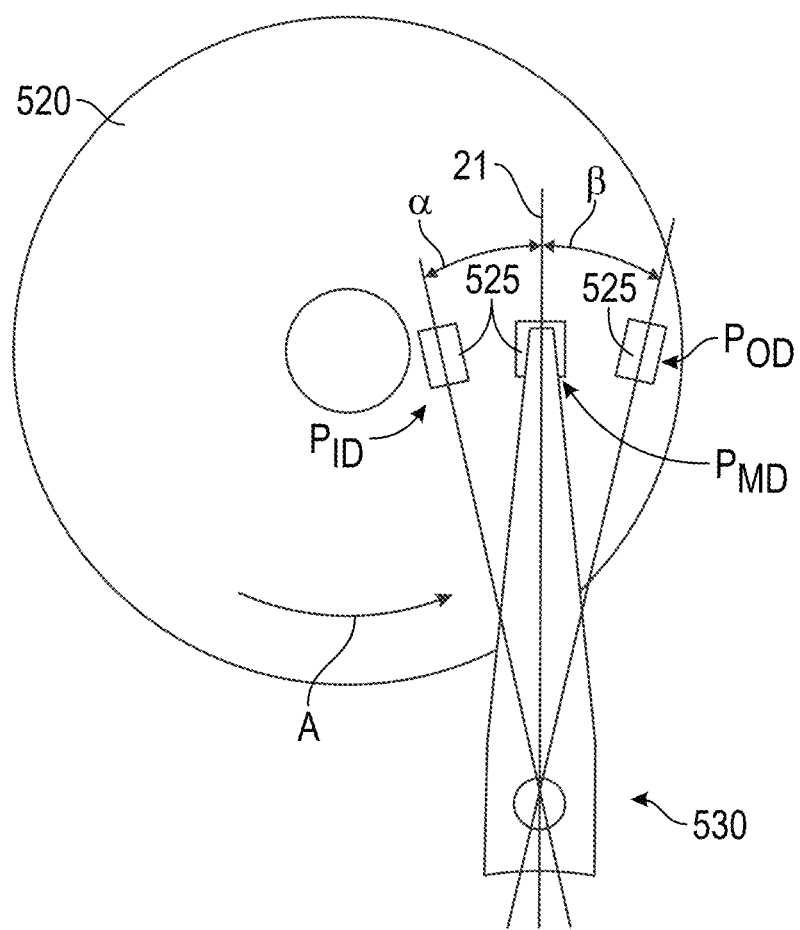
FIG. 1F is a diagram illustrating skew angles of the slider at different positions with respect to the recording medium.

FIG. 1F is a diagram of a slider 525 over a recording medium 520 of a data storage device 500 to illustrate skew angles of the slider 525 at different positions with respect to the recording medium 520. The suspension and actuator arm 530 supports the slider 525 above the surface of the recording medium 520 at locations including an inner diameter (ID) position PID, an outer diameter (OD) position POD, and positions between PID and POD, including the mid-disk (MD) position PMD. As the recording medium 520 spins, it produces airflow in a direction tangential to the recording medium 520 in the direction the recording medium 520 spins, as shown by the arrow A. The angle of misalignment of the direction of the airflow and the centerline 21 of the slider 525 is known as the skew angle.

When the slider 525 is at the mid-disk position PMD, the centerline 21 of the slider 525 is approximately aligned with the direction of the airflow produced by the recording medium 520. In this case, the skew angle is approximately 0 (zero). When the slider 525 is at other positions over the recording medium 520, however, the centerline 21 of the slider 525 is not aligned with the direction of the airflow produced by the recording medium 520. As shown in FIG. 1F, when the slider 525 is at the ID position PID, the skew angle is α, which is the maximum skew angle in the ID direction. When the slider 525 is at the OD position POD, the skew angle is β, which is the maximum skew angle in the OD direction.

The skew angle affects the aerodynamic characteristics of the slider ABS and particle robustness of the slider 525 at different positions over the recording medium 520. Generally, the greater the skew angle, the lower the lift produced for a given airflow velocity. Moreover, when the slider 525 skew angle is nonzero, unwanted particles can enter the outer-diameter side cavity 110A and/or the inner-diameter side cavity 110B along with desired airflow. Greater skew angles typically result in a higher likelihood of particles entering the outer-diameter side cavity 110A and the inner-diameter side cavity 110B. This problem can be particularly acute when the slider 525 is at the ID position PID and when the slider 525 is at the OD position POD. Even when the skew angle is zero, particles, lube pick-up, contaminants, and/or other debris, referred to generally herein as smear, can build up on the ABS 150, which can lead to undesirable fly height variability and/or damage the recording media and head sensors (e.g., the NFT 74), thereby causing data stored on the media to be erased.

As explained above, smear build-up, and changes to smear build-up, can have an adverse impact on the performance of a data storage device 500. Smear may be largely unavoidable, however. Accordingly, one objective of the approaches disclosed herein is to mitigate or prevent smear build-up in particular locations of the ABS 150 (e.g., avoid build-up where it is more likely to cause fly height changes, where it is more likely to heat the NFT 74, etc.).

Disclosed herein are slider ABS designs that provide improved robustness to smear and/or particles without sacrificing flight characteristics (e.g., slider stability). The disclosed embodiments promote particle collection and/or smear build-up in locations where the presence of and/or changes to smear do not have an appreciable effect on performance (e.g., of the NFT 74, to the fly height, etc.).

In particular, disclosed herein are slider ABS designs that prevent at least some particles from reaching the recording head 540, thereby preventing or mitigating the formation of smear at the recording head 540 (e.g., on the NFT 74 at the ABS 150). In some embodiments, as described further below, the slider 525 includes a deep hole in the trailing edge pad 140 and an island blocker situated inside of the hole. The hole is provided to trap particles (e.g., suction particles into the hole's interior) so they do not reach the recording head 540 (or the NFT 74) or build up on the surfaces of the trailing edge pad 140. The island blocker is configured to block particles before they reach the recording head 540 for all expected skew angles (e.g., between and including the maximum ID and maximum OD skew angles). The island blocker may be configured to direct particles to locations where they will have a negligible effect on the flight characteristics (e.g., fly height) of the slider 525. For example, the island blocker can redirect particles into the hole in the trailing edge pad 140. The hole and island blocker, which can be referred to as a particle-blocking structure, may be created using conventional fabrication processes (e.g., photolithography).

Figure 2A:
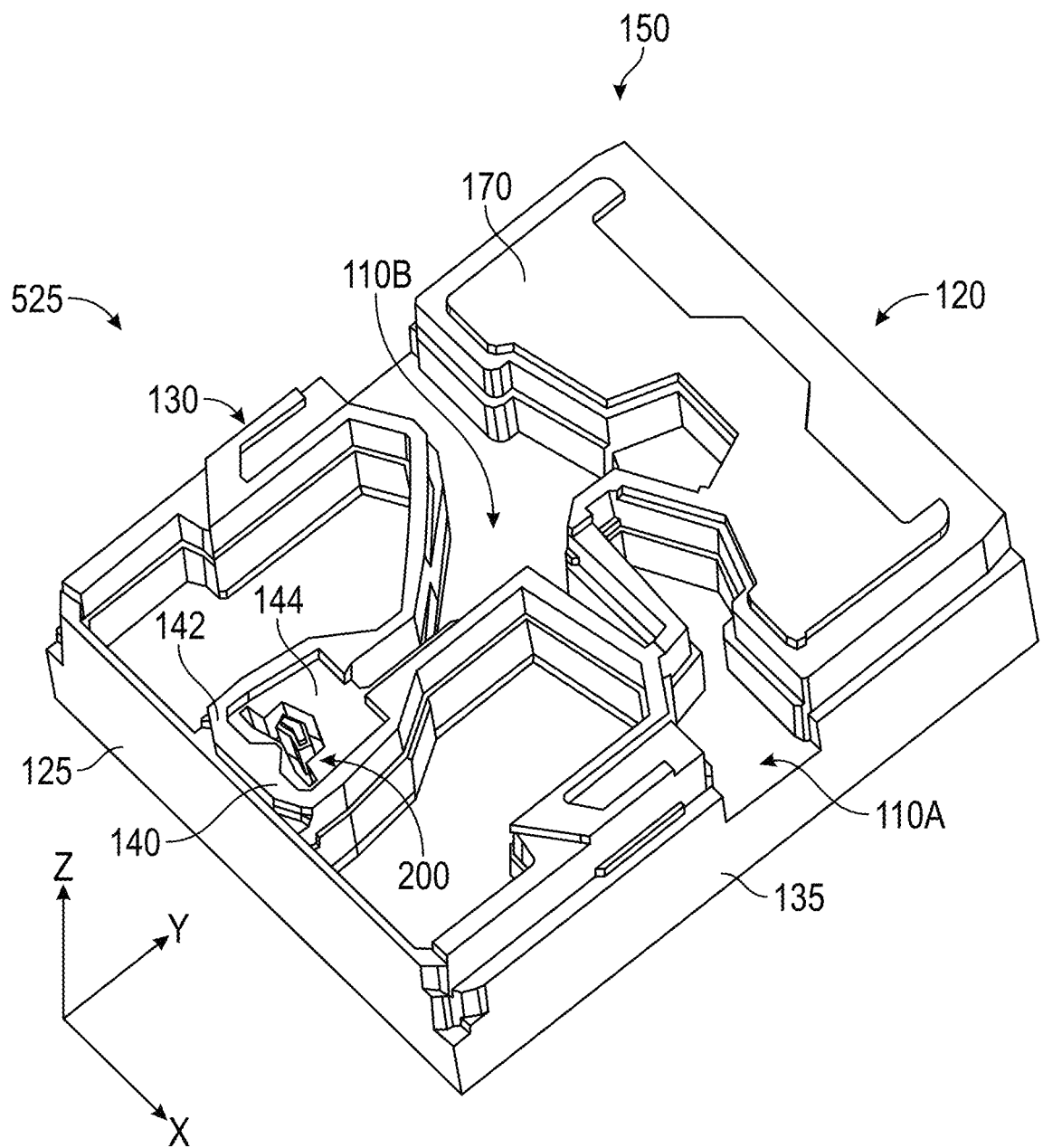
Figure 2B:
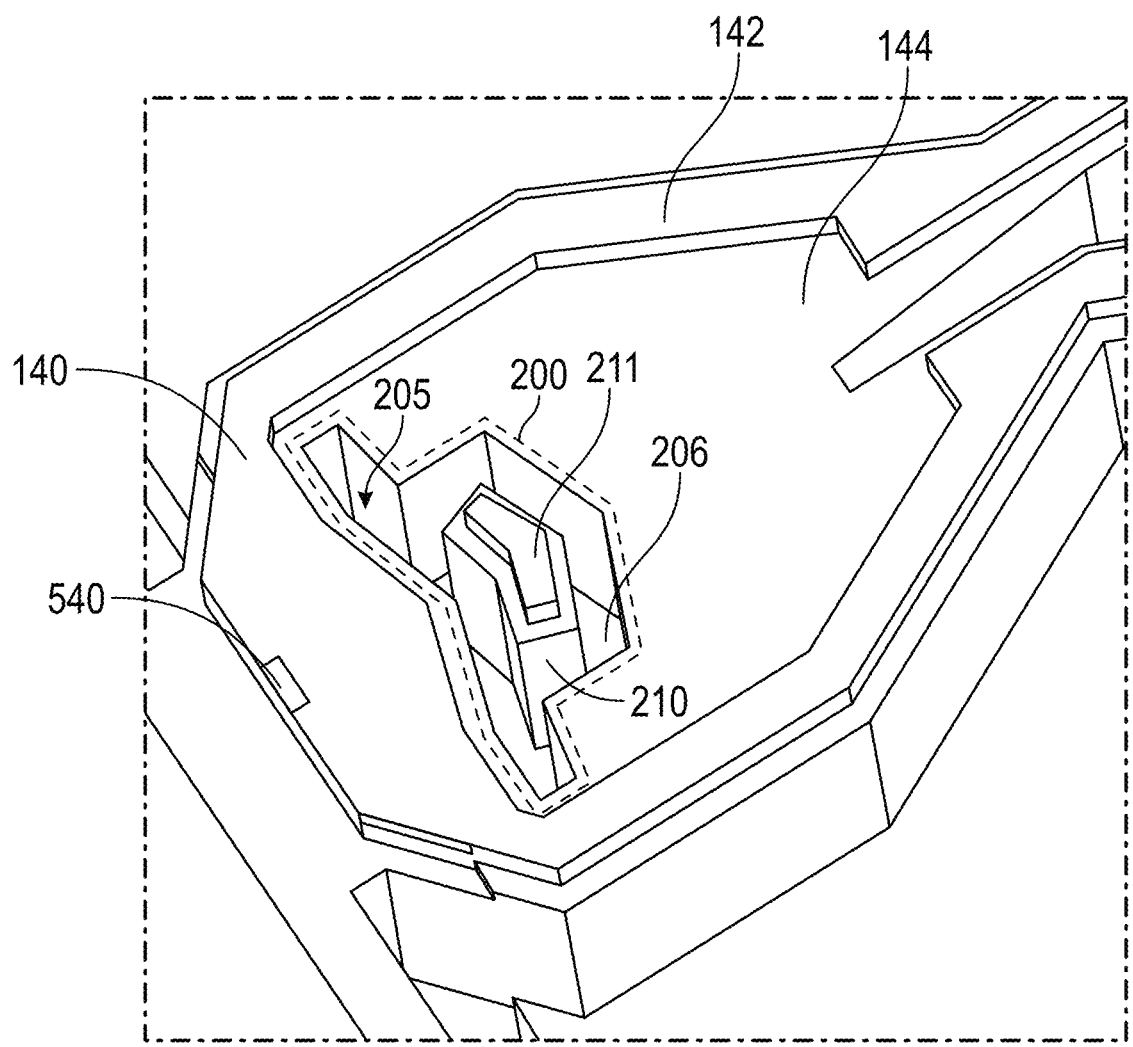

FIGS. 2A, 2B, 2C, 2D, and 2E illustrate an example of a particle-blocking structure in accordance with some embodiments. In particular, FIG. 2A is a perspective view of an example of a slider 525 that includes a particle-blocking structure 200 in accordance with some embodiments. FIG. 2B is a closer perspective view of the trailing edge pad 140 of the slider 525, showing the particle-blocking structure 200 in more detail. FIG. 2C is an ABS view of the trailing edge pad 140 showing the particle-blocking structure 200 of FIGS. 2A and 2B. FIG. 2D is a closer ABS view of the particle-blocking structure 200 of FIGS. 2A, 2B, and 2C. FIG. 2E is a cross-section view of the particle-blocking structure 200 and a portion of the rest of the trailing edge pad 140 at the location indicated in FIG. 2D.

As illustrated by FIGS. 2A-2E, the particle-blocking structure 200 is situated in the trailing edge pad 140 of the slider 525. A location of a recording head 540 is also depicted in FIGS. 2B and 2C, but it is to be appreciated that the rectangle representing the recording head 540 in the drawings is not to scale. The particle-blocking structure 200 is a separate feature from the recording head 540, and the particle-blocking structure 200 is situated some distance from the recording head 540. For example, the recording head 540 is not inside of the hole 205 or the island blocker 210, nor does the recording head 540 touch the island blocker 210. In the example illustrated in FIGS. 2A-2E, the particle-blocking structure 200 is situated in the inner region 144 of the trailing edge pad 140, whereas the recording head 540 is situated in the outer region 142 of the trailing edge pad 140. As explained further below, in the airflow direction, at all expected skew angles, the particle-blocking structure 200 is in front of the recording head 540.

The particle-blocking structure 200 includes a hole 205 and an island blocker 210 situated within the hole 205. The hole 205 has a bottom surface 206 and, in the illustrated example, vertical walls that extend up from the bottom surface 206 when the slider 525 is in an orientation in which the ABS 150 is oriented upward (i.e., facing up). The hole 205 is open only at the ABS 150. In other words, when the slider 525 is oriented with the ABS 150 facing upward, the hole 205 has an opening only at its top. There is no path into or out of the hole 205 from any side direction.

The hole 205 can have any suitable size and shape. The examples illustrated herein are not intended to be limiting. In the cross-track direction, the hole 205 has a maximum width 207. In some embodiments, the maximum width 207 is at least 75 percent of the maximum width 147 of the inner region 144. In FIGS. 2A-2E, the hole 205 is illustrated as being at the deepest level of the ABS 150 (e.g., at the same level as the surface 181), but it is to be appreciated that the hole 205 can be less deep than illustrated. As explained further below, it may be advantages for the hole 205 to be deeper rather than shallower to provide good particle-capture properties and/or to improve robustness to vibrations due to, for example, smear drop-off.

The island blocker 210 does not touch any surface of the hole 205 except the bottom surface 206. In other words, the island blocker 210 is situated inside of the hole 205, and part of it may extend in the z direction beyond the hole 205, but the island blocker 210 does not contact any of the interior surfaces of the hole 205 except the bottom surface 206 (hence the name "island blocker").

The island blocker 210 can have any suitable size and shape. In some embodiments, the island blocker 210 has a form factor (e.g., at least one of size or shape) selected such that, regardless of the skew angle, the island blocker 210 blocks and/or redirects (e.g., into the hole 205) particles that are moving toward the recording head 540 in the airflow direction. In other words, the size and/or shape and/or form factor of the island blocker 210 is such that the island blocker 210 is situated in front of the NFT 74 in the airflow direction at all skew angles between (and including) the maximum inner-diameter skew angle and the maximum outer-diameter skew angle. As a result, the island blocker 210 is designed and situated to prevent oncoming particles traveling substantially in the airflow direction from reaching the recording head 540 and the NFT 74.

It may be desirable or convenient to design the island blocker 210 such that it will block oncoming particles having angles of arrival within a specified range. This specified range may account for the expected skew angles of the slider 525 as the data storage device 500 operates. It may be convenient to specify the angles of arrival of particles to be blocked relative to the centerline 21 of the slider 525 (e.g., angles of arrival within a specified number of degrees or radians to either side of the centerline 21). For example, the island blocker 210 can have a form factor such that the island blocker 210 blocks oncoming particles with angles of arrival within a specified range of the centerline 21. As a specific example, the island blocker 210 can have a form factor (e.g., physical design, size, shape) such that it blocks oncoming particles with angles of arrival within a first angular range on a first side of the centerline 21 and within a second angular range on a second side of the centerline 21. The extents of the first and second angular ranges could be, for example, the maximum inner-diameter and outer-diameter skew angles.

In the example illustrated in FIGS. 2A-2E, the island blocker 210 has a lower portion 212 and an upper portion 214, which are labeled in FIGS. 2D and 2E. The upper portion 214 extends from the top of the lower portion 212 by a distance 231, which, in the illustrated example, is also the distance by which the surface 145 of the trailing edge pad 140 (the inner region 144) is recessed from the surface 141 of the trailing edge pad 140 (the outer region 142). The upper portion 214 of the island blocker 210 has a media-facing surface 211. The media-facing surface 211 is at the same level of the ABS 150 as the surface 141 of the outer region 142.

In the illustrated example, the upper portion 214 of the island blocker 210 extends out of the lower portion 212. The top surface of the lower portion 212 of the island blocker 210 forms a ledge 213 that, in the ABS view, surrounds the upper portion 214 (see FIGS. 2C and 2D). In the example, the ledge 213 is recessed from the surface 141 of the outer region 142 of the trailing edge pad 140 by the distance 231, which is also the recess distance of the surface 145 of the inner region 144 relative to the surface 141 of the outer region 142. Stated another way, the ledge 213 is at the same level of the ABS 150 as the surface 145 of the inner region 144 of the trailing edge pad 140. The distance 231 can be any suitable value (e.g., between about 50 nm and about 300 nm).

It is not a requirement for the island blocker 210 to include a lower portion 212 and an upper portion 214. It may be convenient for the island blocker 210 to have such a configuration, however. For example, as will be appreciated by those having ordinary skill in the art, certain photolithography steps can cause the formation of non-vertical sidewalls in the photoresist patterns, an effect known as "fencing." If the manufacturing step used to create the hole 205 causes fencing to be present on the lower portion 212, it may be desirable to create an upper portion 214 of the island blocker 210 using a process that does not cause fencing to reduce the likelihood that the media-facing surface 211 of the island blocker 210 has sharp edges that could damage the recording medium 520.

FIGS. 3A, 3B, and 3C illustrate an example of an island blocker 210 that does not include a lower portion 212 and an upper portion 214. In particular, FIG. 3A is an ABS view of the trailing edge pad 140 showing the particle-blocking structure 200, FIG. 3B is a closer ABS view of the particle-blocking structure 200 of FIG. 3A, and FIG. 3C is a cross-section view of the particle-blocking structure 200 and a portion of the rest of the trailing edge pad 140 at the location indicated in FIG. 3B. As illustrated, in the example shown in FIGS. 3A, 3B, and 3C, the island blocker 210 has no ledge 213. An island blocker 210 such as shown in FIGS. 3A, 3B, and 3C may be suitable if the manufacturing process used to create surfaces at the level of the media-facing surface 211 does not introduce fencing, or if any surface irregularities or defects in the island blocker 210 left by the manufacturing process do not result in intolerable performance degradations (e.g., too much fly height variability due to particles sticking to side surfaces of the island blocker 210, damage to the recording medium 520, etc.).

Figure 4A:
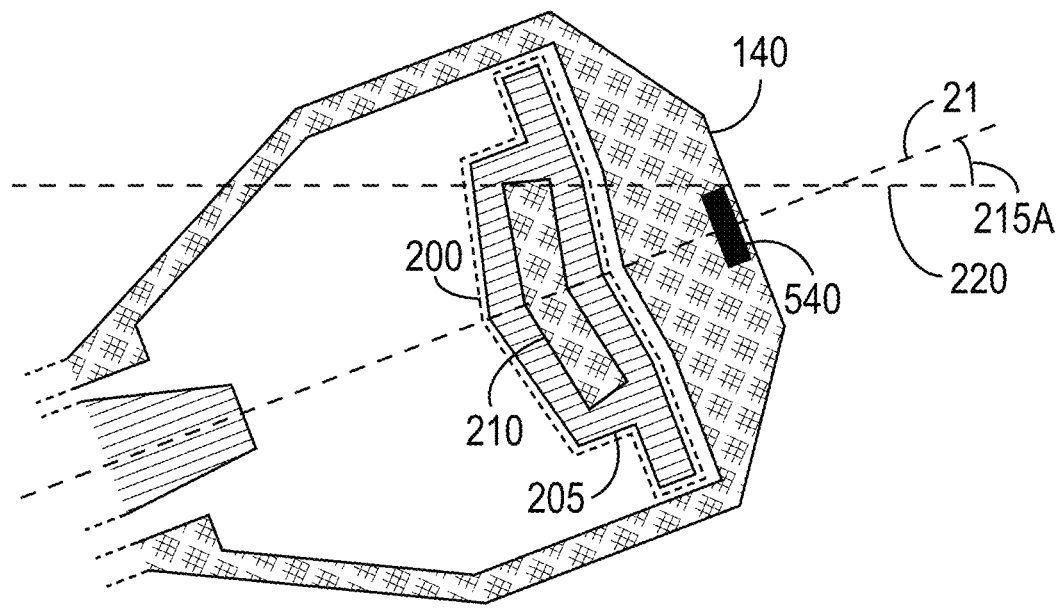
FIGS. 4A and 4B illustrate how the particle-blocking structure is configured to mitigate or prevent particles from reaching the recording head when the slider is at, respectively, the maximum inner-diameter skew angle and the maximum outer-diameter skew angle.

As explained above in the discussion of FIG. 1F, in a data storage device 500 that uses spinning media (e.g., hard disk drives, such as HAMR drives), the slider skew angle changes depending on the position of the slider 525 over the recording medium 520. In some embodiments, the particle-blocking structure 200, and in particular the size and/or shape of the island blocker 210, are selected so that the island blocker 210 blocks and/or redirects oncoming particles that, absent the presence of the particle-blocking structure 200, would likely arrive at the recording head 540 (e.g., absent changing course). FIG. 4A is a diagram to illustrate how the particle-blocking structure 200 is configured to mitigate or prevent particles from reaching the recording head 540 when the slider 525 is at the maximum inner-diameter skew angle 215A (where, as explained above, the skew angle is the angle between the centerline 21 of the slider 525 and the air flow direction). Assuming the particles fly in the direction of the arrow 220 shown in FIG. 4A, which is the air flow direction (see, e.g., the direction 572 of FIG. 1A and/or the arrow labeled A in FIG. 1F), the island blocker 210 is wide enough in the x direction (the cross-track direction) to block oncoming particles, even at the maximum inner-diameter skew angle 215A.

Figure 4B:
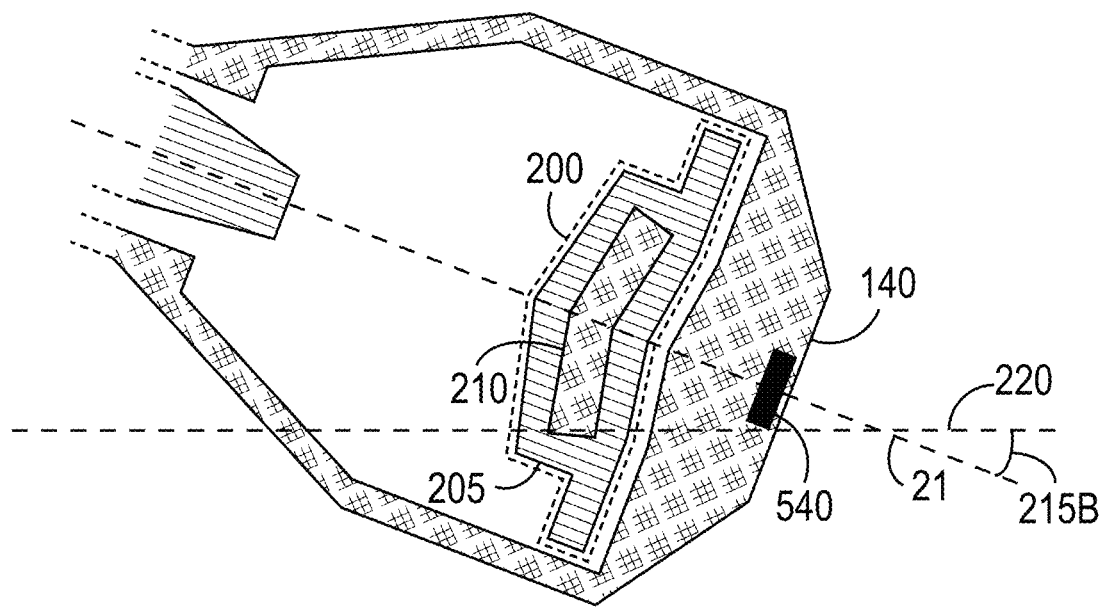

Similarly, FIG. 4B is a diagram to illustrate how the particle-blocking structure 200 is configured to mitigate or prevent particles from reaching the recording head 540 when the slider 525 is at the maximum outer-diameter skew angle 215B. Assuming again that the particles fly in the direction of the arrow 220, which is the air flow direction, the island blocker 210 is wide enough in the x direction (the cross-track direction) to block oncoming particles, even at the maximum outer-diameter skew angle 215B.

Another interpretation of FIGS. 4A and 4B is that the island blocker 210 has a form factor such that it blocks oncoming particles with angles of arrival within a specified range of a centerline of the slider. In the illustrated example, the specified range includes a first angular range extending from the centerline 21 to the maximum inner-diameter skew angle 215A on a first side of the centerline 21 and a second angular range extending from the centerline 21 to the maximum outer-diameter skew angle 215B on a second side of the centerline 21.

Although FIGS. 2A through 4B illustrate the island blocker 210 as having particular shapes (e.g., in the ABS views), in general, the island blocker 210 can have any suitable size and/or shape that allow it to block particles that might otherwise reach the recording head 540 while not having an adverse effect on the fly height of the slider 525. To mitigate the impact of the island blocker 210 on the fly height, it is desirable for the island blocker 210 to be small. To provide good particle blocking and/or deflection, it is desirable for the island blocker 210 to have a wide enough extent in the cross-track direction (the x direction, using the axes shown in the drawings) so that it effectively blocks and/or redirects particles at both the maximum inner-diameter skew angle 215A and the maximum outer-diameter skew angle 215B. As explained above, manufacturing processes, and expected imperfections in the island blocker 210, can also be taken into account to design a suitable island blocker 210 (e.g., an island blocker 210 that includes a lower portion 212 and an upper portion 214 and has a ledge 213).

The particle-blocking structure 200 disclosed herein offers a number of potential advantages. For example, creating the particle-blocking structure 200 does not require additional manufacturing steps. Instead, it can be created using and during the same manufacturing steps used to create the rest of the slider 525. For example, assuming the slider 525 is manufactured using photolithography, the particle-blocking structure 200 can be created simply by modifying the masks used. The hole 205 can be created during the same step as other areas/features with the same depth (which can be any suitable depth, e.g., between about 800 nm and about 5000 nm from the media-facing surface 211) are created. The island blocker 210 example shown in FIGS. 3A through 4B can be created during the same manufacturing step in which the outer region 142 is created. The lower portion 212 of the island blocker 210 example shown in FIGS. 2A through 2E (e.g., the ledge 213) can be created during the same manufacturing step as the inner region 144, and the upper portion 214 (e.g., the media-facing surface 211) can be created during the same manufacturing step in which the outer region 142 is created. Thus, the particle-blocking structure 200 is a cost-effective approach to smear mitigation and management.

Figure 5A:
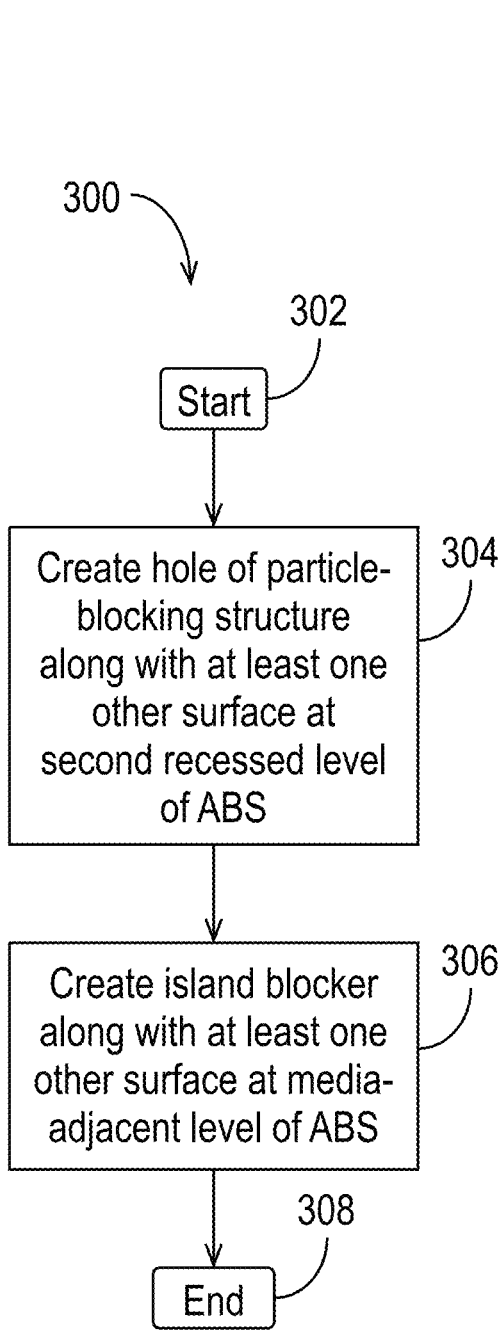
FIG. 5A is a flow diagram illustrating a method of manufacturing a slider that includes a particle-blocking structure in accordance with some embodiments.

FIG. 5A is a flow diagram illustrating a method 300 of manufacturing a slider 525 that includes a particle-blocking structure 200 in accordance with some embodiments. The method 300 could be used, for example, to manufacture a slider 525 with a particle-blocking structure 200 as shown in FIGS. 3A through 4B. The method 300 begins at block 302. At block 304, the hole 205 of the particle-blocking structure 200 is created in the same manufacturing step in which at least one other surface at the second recessed level of the ABS 150 is created. The manufacturing step can use any suitable process (e.g., milling, etc.). At block 306, the island blocker 210 is created in the same manufacturing step in which at least one other surface at the media-adjacent surface of the ABS 150 is created. The manufacturing step can use any suitable process (e.g., etching, etc.). At block 308, the method 300 ends.

Figure 5B:
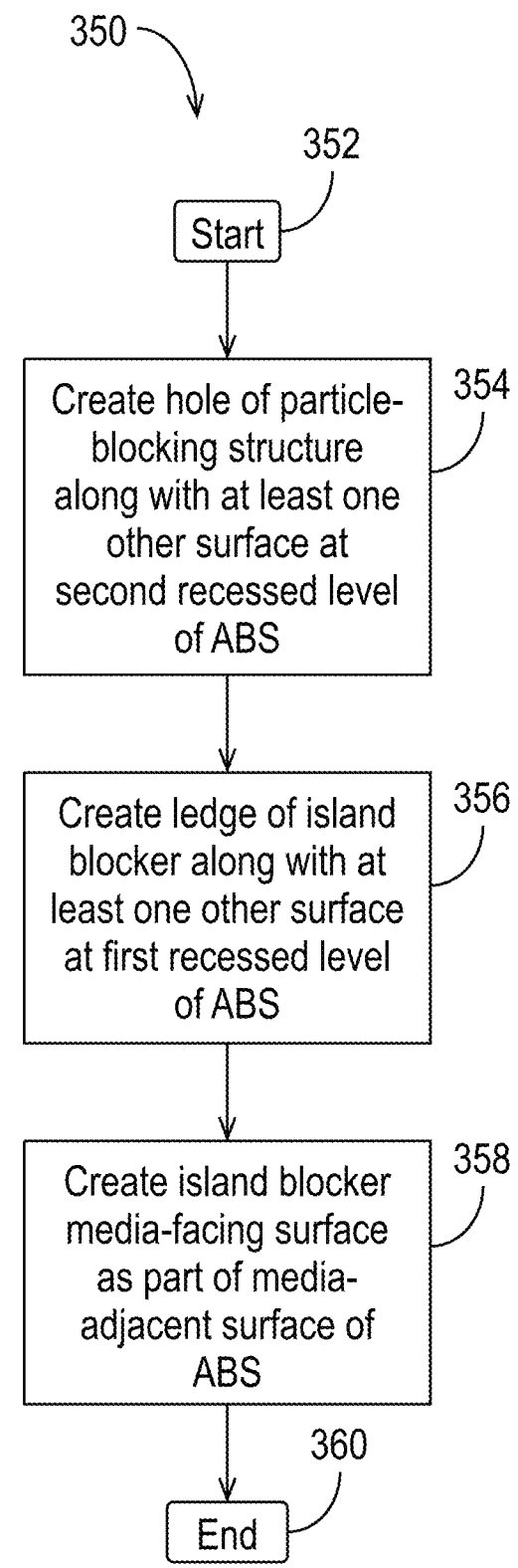
FIG. 5B is flow diagram of another method of manufacturing a slider that includes a particle-blocking structure in accordance with some embodiments.

FIG. 5B is flow diagram of another method 350 of manufacturing a slider 525 that includes a particle-blocking structure 200 in accordance with some embodiments. The method 350 could be used, for example, to manufacture a slider 525 with a particle-blocking structure 200 as shown in FIGS. 2A through 2E. The method 350 begins at block 352. At block 354, the hole 205 of the particle-blocking structure 200 is created in the same manufacturing step in which at least one other surface at the second recessed level of the ABS 150 is created. The manufacturing step can use any suitable process (e.g., milling, etc.). At block 356, the ledge 213 of the island blocker 210 is created in the same manufacturing step in which at least one other surface at the first recessed surface (e.g., the surface 145 of the inner region 144 of the trailing edge pad 140) of the ABS 150 is created. The manufacturing step can use any suitable process (e.g., etching, etc.). At block 358, the media-facing surface 211 of the island blocker 210 is created in the same manufacturing step in which at least one other surface of the media-adjacent surface of the ABS 150 is created. The manufacturing step can use any suitable process (e.g., etching, etc.). At block 360, the method 300 ends.

Another potential advantage of the particle-blocking structure 200 is that it provides robustness to smear without sacrificing other slider 525 performance objectives. For example, the particle-blocking structure 200 has little effect on the overall flying characteristics of the slider 525 because it is small (e.g., the media-facing surface 211 of the island blocker 210 is small in comparison to the rest of the features of the media-adjacent surface of the slider 525). Therefore, the particle-blocking structure 200 can be added to the ABS 150 and can mitigate the effects of particles and smear without significantly affecting the flying characteristics of the slider 525.

Another potential advantage of the particle-blocking structure 200 is that it offers two types of protection against smear. The hole 205 is provided to trap particles, and the island blocker 210 is provided to block particles that are not trapped by the hole 205. This dual approach provides good smear mitigation.

Another potential advantage of the particle-blocking structure 200 is that the hole 205 traps particles that could otherwise build up elsewhere on the slider 525 (e.g., on the surface 145 of the inner region 144 of the trailing edge pad 140) and thereby cause the fly height to change (e.g., increase due to smear build-up and decrease due to smear drop-off). Thus, use of the particle-blocking structure 200 can reduce fly height variability and other effects that smear can have on the slider 525 flight characteristics.

A related potential advantage of the particle-blocking structure 200 is that the discontinuities it creates in the ABS 150 provide higher damping of vibrations. For example, smear drop-off can cause the trailing edge of the slider 525 to vibrate. In addition to reducing smear build-up (and drop-off) events (e.g., by trapping particles in the hole 205), the particle-blocking structure 200 provides better damping when such events do occur. As a result, the effects of transient fly height changes are reduced. Viscous shearing is lower because the trailing edge of a slider 525 with the particle-blocking structure 200 vibrates less, and for a shorter period of time, than a slider 525 without the particle-blocking structure 200.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A slider for a data storage device, the slider having an air-bearing surface (ABS) that includes at least three levels, the at least three levels including a media-adjacent level, a first recessed level, and a second recessed level, wherein, in an orientation in which the ABS is oriented upward, the media-adjacent level is above the first recessed level, and the first recessed level is above the second recessed level, the slider comprising:
a trailing pad comprising a recording head, an outer surface, and an inner surface, wherein the outer surface is at the media-adjacent level and the inner surface is at the first recessed level;
a hole in the inner surface of the trailing pad, wherein a bottom surface of the hole is at the second recessed level; and
an island blocker situated within the hole, wherein a media-facing surface of the island blocker is at the media-adjacent level,
wherein the recording head is situated between the island blocker and a trailing edge of the slider.

2. The slider recited in claim 1, wherein a maximum width of the hole in a cross-track direction is at least 75 percent of a maximum width of the inner surface of the trailing pad in the cross-track direction.

3. The slider recited in claim 1, wherein at least one of a size or a shape of the island blocker is configured to block and/or redirect particles moving in an airflow direction toward the recording head at all slider skew angles between a maximum inner-diameter skew angle and a maximum outer-diameter skew angle.

4. The slider recited in claim 1, wherein the first recessed level is recessed from the media-adjacent level by between about 50 nm and about 300 nm.

5. The slider recited in claim 4, wherein the second recessed level is recessed from the media-adjacent level by between about 500 nm and about 2500 nm.

6. The slider recited in claim 1, wherein the recording head comprises a heat-assisted magnetic recording (HAMR) writer.

7. A method of manufacturing the slider recited in claim 1, the method comprising:
in a first manufacturing step in which at least one other surface at the second recessed level is created, creating the hole; and
in a second manufacturing step in which at least one other surface at the media-adjacent level is created, creating the island blocker.

8. The slider recited in claim 1, wherein the island blocker comprises a lower portion and an upper portion.

9. The slider recited in claim 1, wherein the island blocker comprises a ledge at the first recessed level.

10. A method of manufacturing the slider recited in claim 9, the method comprising:
in a first manufacturing step in which at least one other surface at the second recessed level is created, creating the hole;
in a second manufacturing step in which at least one other surface at the first recessed level is created, creating the ledge; and
in a third manufacturing step in which at least one other surface at the media-adjacent level is created, creating the media-facing surface of the island blocker.

11. A data storage device, comprising:
a recording media; and
the slider recited in claim 1.

12. A slider for a heat-assisted magnetic recording (HAMR) data storage device, the slider comprising:
a HAMR head comprising a near-field transducer (NFT) situated on an outer region of a trailing pad of the slider; and
a particle-blocking structure configured to mitigate a formation of smear on a media-facing surface of the NFT, the particle-blocking structure comprising an island blocker within a hole in an inner surface of the trailing pad of the slider, the hole extending perpendicular to an air-bearing surface (ABS) of the slider,
wherein:
the island blocker has a form factor such that the island blocker blocks oncoming particles with angles of arrival within a specified range of a centerline of the slider.

13. The slider recited in claim 12, wherein the specified range includes a first angular range on a first side of the centerline and a second angular range on a second side of the centerline.

14. The slider recited in claim 12, wherein a depth of the hole is between about 800 nm and about 5000 nm relative to the media-facing surface of the NFT.

15. A method of manufacturing the slider recited in claim 12, the method comprising:
in a first manufacturing step, creating the hole; and
in a second manufacturing step performed after the first manufacturing step, creating the island blocker.

16. The slider recited in claim 12, wherein the island blocker comprises a lower portion and an upper portion.

17. The slider recited in claim 12, wherein the island blocker comprises a ledge, wherein the ledge is recessed from a media-facing surface of the island blocker.

18. The slider recited in claim 17, wherein a recess distance between the media-facing surface of the island blocker and the ledge is between about 50 nm and about 300 nm.

19. A method of manufacturing the slider recited in claim 17, the method comprising:
in a first manufacturing step, creating the hole;
in a second manufacturing step performed after the first manufacturing step, creating the ledge; and
in a third manufacturing step performed after the second manufacturing step, creating the media-facing surface of the island blocker.

20. A data storage device, comprising:
a recording media; and
the slider recited in claim 12.

* * * * *